United States Patent [19]

Sunaga et al.

[11] 4,373,170
[45] Feb. 8, 1983

[54] PLAYBACK MODE SWITCHING CIRCUIT FOR TAPE RECORDER

[75] Inventors: Yoshimitsu Sunaga; Satoru Honda, both of Saitama, Japan

[73] Assignee: Pioneer Electronic Corporation, Tokyo, Japan

[21] Appl. No.: 169,254

[22] Filed: Jul. 16, 1980

[30] Foreign Application Priority Data

Jul. 16, 1979 [JP] Japan .................. 54-90047
Jul. 16, 1979 [JP] Japan .................. 54-90048

[51] Int. Cl.³ .................... G11B 17/00; G11B 15/48; G11B 15/18
[52] U.S. Cl. .................... 360/71; 360/74.1; 360/74.5
[58] Field of Search ............... 360/71, 72.3, 73, 74.1, 360/74.5, 93, 96.1, 96.4, 90, 74.6, 74.7

[56] References Cited

U.S. PATENT DOCUMENTS

| | | | |
|---|---|---|---|
| 3,549,823 | 12/1970 | Pastor | 360/74.5 |
| 3,810,238 | 5/1974 | Staar | 360/74.6 |
| 3,921,215 | 11/1975 | Asami | 360/71 |
| 4,279,006 | 7/1981 | Sasaki | 360/74.1 |
| 4,301,481 | 11/1981 | Suzuki | 360/74.1 |

Primary Examiner—Robert M. Kilgore
Attorney, Agent, or Firm—Sughrue, Mion, Zinn, Macpeak & Seas

[57] ABSTRACT

A playback mode switching circuit for a tape recorder in which, when the direction of rotation of the capstan motor is changed upon switching between playback modes, a predetermined period of time is provided for stabilizing the rotation of the capstan motor from the time instant that the playback mode is switched until a new playback operation has been established. Also, if a playback mode switching operation is effected during the predetermined period of time, the predetermined period of time is lengthened. A capstan drive circuit operates in response to outputs of a first flip-flop the state of which is determined by the application thereto of forward and reverse operation switching signals. The outputs of the first flip-flop are differentiated and coupled to a one-shot multivibrator which determines the period of time before which the newly-selected playback mode can be effected. A second flip-flop which operates in response to fast-forward and rewind switching signals is coupled through a gating circuit controlled by outputs of the first flip-flop circuit to differentiation circuits the outputs of which are coupled to forward and reverse inputs of a control circuit.

6 Claims, 1 Drawing Figure

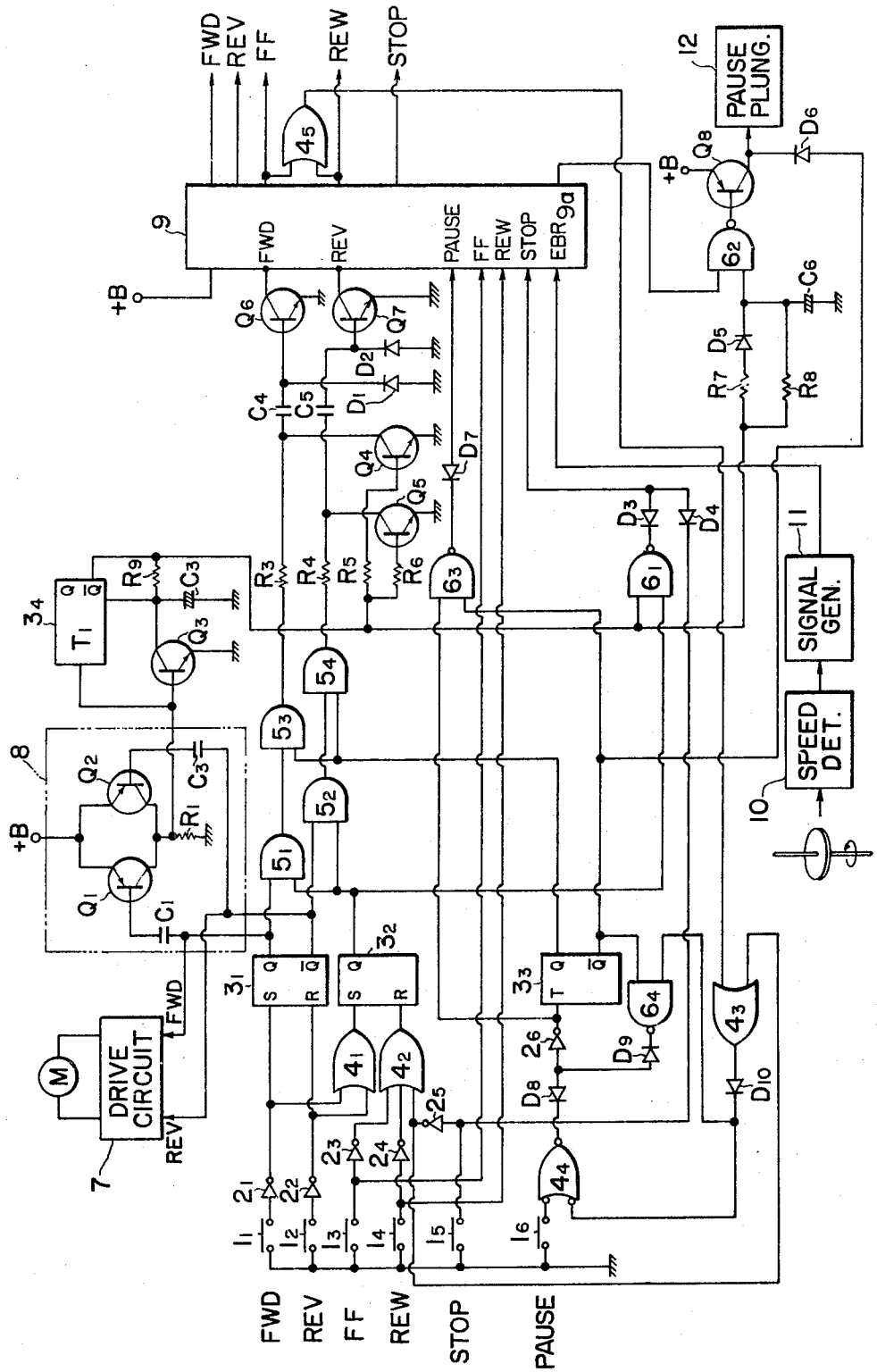

PLAYBACK MODE SWITCHING CIRCUIT FOR TAPE RECORDER

SUMMARY OF THE INVENTION

A primary object of the invention is to provide a tape recorder having a reproduction switching circuit in which forward and reverse playback modes can be selectively actuated and in which when changing between modes, playback is automatically suspended.

Another object of the invention is to provide a tape recorder having a playback mode switching pause period setting circuit in which, when the direction of rotation of the capstan motor is changed upon switching between playback modes, a period of time is provided for stabilizing the rotation of the capstan motor from the time instant that the playback mode is switched until a new playback operation has started.

A further object of the invention is to provide a tape recorder having a playback mode switching pause period setting circuit in which, when the direction of rotation of the capstan motor is changed upon switching between playback modes, a period of time is provided for stabilizing the rotation of the capstan motor from the time instant that the playback mode is switched until a new playback operation has started and in which, when the playground mode switching operation is effected again during the above-described operation the period of time is prolonged.

In accordance with these, and other objects of the invention, there is provided a playback mode switching pause period setting circuit for a tape recorder including a control circuit, a first flip-flop coupled to be set, that is, placed in the state with its Q output in the high level, by a forward operation signal and reset by a reverse operation signal. A drive circuit operates in response to first and second outputs of the first flip-flop circuit for determining the direction of rotation of the capstan motor of the tape recorder. A differentiation circuit and gate means with the first and second outputs of the first flip-flop circuit being applied through the differentiation circuit and the gate means to the control circuit determine the direction of rotation of the reel motor then actuated of the tape recorder. The control circuit is placed in a stop state by operation of a one-shot multivibrator which operates for a predetermined period of time in response to an output of the differentiation circuit. A second flip-flop circuit is provided with the gate means coupled to operate in response to outputs of the second flip-flop circuit which may be set by either one of a forward operation signal or a reverse operation signal and which is reset by a fast-forward operation signal or a rewind operation signal. In this circuit, when the direction of rotation of the capstan motor is changed by effecting a forward or a reverse operation during a fast-forward operation or a rewind operation, the control circuit is set to a stop state for a fixed predetermined period of time.

Yet further, there can be provided a second flip-flop circuit which is coupled to be alternately set and reset whenever a pause operation signal is applied thereto to effect a pause operation or to release the pause operation. In this case, the gate means mentioned above is coupled to operate in response to the outputs of the second flip-flop circuit. In this construction, when the direction of rotation of the capstan motor is changed by effecting a forward operation or a reverse operation during a pause operation, the control circuit is maintained in a stop state for the fixed predetermined period of time after the forward operation or the reverse operation has been effected even if the pause operation is released.

BRIEF DESCRIPTION OF THE DRAWING

The single drawing FIGURE is a schematic diagram of a preferred embodiment of a playback switching circuit of the invention.

DESCRIPTION OF THE PREFERRED EMBODIMENT

A preferred embodiment of the invention will be described with reference to the single drawing FIGURE. The preferred embodiment is described with regards to a tape recorder having a capstan motor which can rotate in both directions, namely, a forward direction and a reverse direction, a right reel motor for driving a right reel for winding tape thereon and a left reel motor for driving a left reel for winding tape thereon.

In such a tape recorder, in the forward playback mode in which tape is run in the right direction at a constant speed electromagnetic braking is employed to provide a steady torque with the right reel motor and slight torque with the left reel motor to thereby apply back tension to the tape with the capstan motor rotated in the forward direction. For the reverse playback mode, the tape is run in the left direction at a constant speed and electromagnetic braking is used to provide a steady torque with the left reel motor and slight torque with the right reel motor to apply a back tension on the tape with the capstan motor rotated in the reverse direction. A tape fast forwarding operation is carried out by providing a maximum torque with the right reel motor and slight torque with the left reel motor while during a tape rewinding operation the maximum torque is provided with the left reel motor and slight torque with the right reel motor. In both the fast forwarding and rewinding operations, the rotational condition of the capstan motor remains unchanged. In both of the forward and reverse playback modes and for the fast forwarding and rewinding operations, the tape can be stopped by continuously applying electromagnetic braking by decreasing the torque supplied by the tape winding reel and increasing that of the tapw supplying reel. When the speed of the reels has dropped below a certain value, both of the reels are mechanically braked after the driving power has been shut off.

In the single FIGURE, reference character $3_1$ designates a flip-flop circuit for switching between forward and reverse playback modes. Upon depression of a forward switch $1_1$, the output of an inverter $2_1$ is raised to a logical high level "H" as a result of which the flip-flop circuit $3_1$ is set with its output Q is raised to "H" while its output $\overline{Q}$ is set to a logical low level "L." As a result, the capstan motor M is rotated in the forward direction by a drive circuit 7 which receives and is controlled by the outputs Q and $\overline{Q}$ of the flip-flop circuit $3_1$. On the other hand, upon depression of a reverse switch $1_2$, the output of an inverter $2_2$ is raised to "H" to reset the flip-flop circuit $3_1$ so that the outputs Q and $\overline{Q}$ of the flip-flop circuit are set to "L" and "H," respectively. As a result, the capstan motor M is rotated in the reverse direction. The falling edges of the outputs Q and $\overline{Q}$ of the flip-flop circuit $3_1$ are differentiated by a differentiation circuit 8. In the differentiation circuit 8, whenever the flip-flop circuit $3_1$ is set or reset and one of the outputs Q and $\overline{Q}$ makes a transition between the "H" and "L" states, a differentiation signal appearing as a pulse is provided through a capacitor $C_1$ or $C_2$ to thereby render one of parallel-connected transistors $Q_1$ and $Q_2$ conductive and to thereby develop a voltage across resistor $R_1$.

When a voltage is present across the resistor $R_1$, a one-shot multivibrator $3_4$ is triggered and a transistor $Q_3$ is rendered conductive to thereby discharge a capacitor $C_3$. Because the capacitor $C_3$ is discharged, the outputs Q and $\overline{Q}$ of the one-shot multivibrator $3_4$ remain at "L" and "H," respectively, for a period of time $T_1$, where $T_1$ is the output pulse period of the multivibrator $3_4$, after the transistor $Q_3$ has returned to the non-conductive state. Preferably, $T_1$ is of the order of 3 seconds.

The Q output of the flip-flop circuit $3_1$ when it goes to the "H" state is applied through AND gates $5_1$ and $5_3$ to a resistor $R_3$ and a capacitor $C_4$ being differentiated by the resistor $R_3$ and the capacitor $C_4$ to temporarily render transistor $Q_6$ conductive. In this fashion, a high level going pulse on the Q output of the flip-flop circuit $3_1$ is applied as a negative pulse to a forward (FWD) terminal of a control circuit 9. On the other hand, when the $\overline{Q}$ output of the flip-flop circuit $3_1$ goes to the "H" state, the signal is applied through AND gates $5_2$ and $5_4$ to a resistor $R_4$ and a capacitor $C_5$ being differentiated by the resistor $R_4$ and the capacitor $C_5$ to temporarily render a transistor $Q_7$ conductive and to thus apply a negative pulse to a reverse (REV) terminal of the control circuit 9. The capacitor $C_4$ is discharged by a diode $D_1$ and a transistor $Q_4$ or the AND gate $5_3$. The capacitor $C_5$ is discharged by a diode $D_2$ and a transistor $Q_5$ or the AND gate $5_4$. The transistors $Q_4$ and $Q_5$ are rendered conductive when the output $\overline{Q}$ of the one-shot multivibrator $3_4$ is raised to "H."

The AND gates $5_1$ and $5_2$ are opened when the output Q of a flip-flop circuit $3_2$ is raised to "H." The flip-flop circuit $3_2$ is set with the output Q raised to "H" when the output of an OR circuit $4_1$ is set to "H." The flip-flop circuit $3_2$ is reset when the output of an OR circuit $4_2$ is set to "H" as a result of which its output Q is set to "L." In this respect, it should be noted that the output of the OR circuit $4_1$ is raised to "H" by depressing either one of the forward (FWD) switch $1_1$ and reverse (REV) switch $1_2$ when commencing a playback operation while the output of the OR circuit $4_2$ is raised to "H" by depressing any one of a rewind (REW) switch $1_4$, a stop (STOP) switch $1_5$ and a fast-forward (FF) switch $1_3$.

Reference characters $2_3$ through $2_6$ designate inverters. The outputs of the fast-forward switch $1_3$, rewind switch $1_4$ and stop switch $1_5$ are also connected directly to the control circuit 9.

The AND gates $5_3$ and $5_4$ are opened when the output Q of a T-type flip-flop circuit $3_3$ is raised to "H." Whenever the output of the inverter $2_6$ is raised to "H" in response to an output of a pause (PAUSE) or temporary stop switch $1_6$ which is applied through an AND gate $4_4$ which operates as low level active OR circuit and a diode $D_8$ upon depression of the switch $1_6$, the output Q of the flip-flop circuit $3_3$ is set alternately to "H" and "L" while the output $\overline{Q}$ is set alternately to "L" and "H."

When both the output $\overline{Q}$ of the one-shot multivibrator $3_4$ and the output Q of the flip-flop circuit $3_2$ are "H," the output of a NAND circuit $6_1$ is set to "L" and the "L" signal is applied through a diode $D_3$ to a stop (STOP) terminal of the control circuit 9 to which the output of the stop switch $1_5$ is connected through a diode $D_4$.

A speed detecting circuit 10 of known construction detects the reel speed. The output signal from the detecting circuit 10 is applied to a signal generating circuit 11 for generating an electromagnetic braking releasing signal. When the reel speed is reduced to a predetermined value $V_1$, the signal generating circuit 11 provides the braking releasing signal which is applied to an electric brake reset (EBR) terminal of the control circuit 9.

When a negative going pulse is applied to the forward (FED) terminal of the control circuit 9, the control circuit 9 operates to provide the forward playback mode in which the tape is wound on the right reel at a constant speed. On the other hand, when a negative pulse is applied to the reverse (REV) terminal, the control circuit 9 provides for the reverse playback mode in which the tape is wound on the left reel at a constant steady speed. Furthermore, the control circuit 9 operates to provide a fast-forwarding operation in which the tape is wound on the right reel at high speed when a low level signal is applied to the fast-forward (FF) terminal and a rewinding operation in which the tape is rewound on the left reel when a low level signal is applied to the rewind (REW) terminal. In addition, the control circuit 9 operates as follows. When a low level signal is applied to the stop (STOP) terminal, the entire circuit is placed in a stop state. When a low level signal is applied to the pause (PAUSE) terminal, the entire circuit is placed in a pause state. When the low level signal is applied to the electric brake reset (EBR) terminal, the control circuit 9 provides a high level signal at the output terminal $9a$ after a predetermined period of time $T_3$ only for the fast-forward and rewind operations. The high level signal is applied to one input terminal of a NAND circuit $6_2$ to the other input terminal of which the output $\overline{Q}$ of the one-shot multivibrator $3_4$ is applied through a resistor $R_7$ and a diode $D_5$. In this circuit, when both inputs are at "H," the output of the NAND circuit $6_2$ is at "L" thereby rendering a transistor $Q_8$ conductive in response to which a pause plunger 12 is operated as a result of which the pinch roller is retracted from the capstan. The pause plunger 12 is operated also when the output $\overline{Q}$ of the flip-flop circuit $3_3$ is at "H" because it is applied through a diode $D_6$ to the pause plunger.

A capacitor $C_6$ is connected to the other inner terminal of the NAND circuit $6_2$ and accordingly to the output of the diode $D_5$. This, when the output Q of the one-shot multivibrator $3_4$ changes from "H" to "L," the signal to the other input terminal of the NAND circuit $6_2$ is maintained at "L" for a certain period of time thereafter. The capacitor $C_6$ is discharged through a resistor $R_8$ with the resistance of the resistor $R_7$ being lower than that of the resistor $R_8$. Therefore, the voltage across the capacitor $C_6$ rises quickly but falls slowly.

In the circuit thus constructed, upon the activation of an electric source +B, the flip-flop circuit $3_1$ is set with the Q output thereof in the "H" state as a result of which the capstan motor starts forward rotation. At this time, the flip-flop circuit $3_2$ is placed in the reset state with the $\overline{Q}$ output thereof in the "H" state and hence the AND gates $5_1$ and $5_2$ are closed. At the same time, the flip-flop circuit $3_3$ is set so that its outputs Q and $\overline{Q}$ are at "H" and "L," respectively, so that the and gates $5_3$ and $5_4$ are opened. Furthermore, the $\overline{Q}$ output of the one-shot multivibrator $3_4$ is set to "L." In addition, the control circuit 9 is placed in a stop mode for a preset period of time by an internal time constant circuit.

Under this condition, depression of the forward switch $1_1$ sets the flip-flop circuit $3_2$ with the state of the flip-flop circuit $3_1$ remaining unchanged as a result of which the AND gates $5_1$ and $5_2$ are opened. Therefore, the output Q at "H" of the flip-flop circuit $3_1$ is applied through the AND gates $5_1$ and $5_3$ to the differentiation circuit including the resistor $R_3$ and the capacitor $C_4$ where it is differentiated to momentarily render the transistor $Q_6$ conductive as a result of which a negative pulse is applied to the terminal (FWD) of the control circuit 9. Thus, the control circuit 9 sets the conditions for the forward playback mode as described above.

When the reverse (REV) switch $1_2$ is depressed during a forward playback operation, the flip-flop circuit $3_1$ is reset while the state of the flip-flop circuit $3_2$ is maintained unchanged as a result of which the outputs Q and $\overline{Q}$ of the flip-flop circuit $3_1$ are set to "L" and "H," respectively, in response to which the capstan motor M stops forward rotation and starts reverse rotation.

In the differentiation circuit 8, the transistor $Q_1$ is momentarily rendered conductive by the differentiating operation of the capacitor $C_1$ as a result of which a voltage is developed across the resistor $R_1$ which renders the transistor $Q_3$ conductive. Accordingly, the capacitor $C_3$ is discharged through the transistor $Q_3$ and the one-shot multivibrator $3_4$ is triggered. The output $\overline{Q}$ of the multivibrator $3_4$ is maintained at "H" for the period of time $T_1$ preset for the multivibrator during which time the transistors $Q_4$ and $Q_5$ are conductive. The transistor $Q_4$ discharges the capacitor $C_4$ through the diode $D_1$ and the transistor $Q_5$ grounds the high level output signal of the AND gate $5_4$. As the output Q of the flip-flop circuit $3_2$ is at "H," the output of the NAND circuit $6_1$ is maintained at "L" for the period of time $T_1$ preset for the one-shot multivibrator $3_4$ and is applied through the diode $D_3$ to the terminal (STOP) of the control circuit 9.

As is clear from the above description, when the reverse (REV) switch $1_2$ is depressed during a forward playback operation, the control circuit 9 is placed in a stop state and a high level signal is provided at the output terminal 9a. Therefore, the output of the NAND circuit $6_2$ is set to "L" as a result of which the pause plunger 12 is operated through the transistor $Q_8$ and the circuit is placed in the pause state until the speed of reverse rotation of the capstan motor M has reached an acceptable value. When the output $\overline{Q}$ of the one-shot multivibrator $3_4$ is set to "L" in the period of time $T_1$, both of the transistors $Q_4$ and $Q_5$ are rendered non-conductive. When the transistor $Q_5$ is thus rendered non-conductive, the high level output of the AND gate $5_4$ is differentiated producing thereby a pulse signal which renders the transistor $Q_7$ temporarily conductive as a result of which a negative pulse is applied to the reverse terminal (REV) of the control circuit 9 causing the circuit 9 to set the conditions for the reverse playback mode. The pause plunger 12 is released after a period of time $T_2$ after the period of time $T_1$. During this time, the voltage of the capacitor $C_6$ is set to "L" as the capacitor $C_6$ is discharged through the resistor $R_8$.

In switching from the forward playback mode to the reverse playback mode, the direction of rotation of the capstan motor M must be changed. Therefore, the control circuit 9 permits reverse playback only after the rotation of the capstan motor has become stable. This period of time is set to a selected value, about three seconds, by the time constant of the one-shot multivibrator $3_4$.

In the case where the reverse (REV) switch $1_2$ is depressed during a forward playback operation and the forward (FWD) switch $1_1$ is depressed before the period of time $T_1$ has passed, the flip-flop circuit $3_1$ is set again and its outputs Q and $\overline{Q}$ are set to "H" and "L," respectively, as a result of which the differentiation circuit 8 produces a differentiation pulse which causes the discharge of the capacitor $C_3$ through the transistor $Q_3$ and the triggering of the one-shot multivibrator $3_4$. Therefore, the capacitor $C_3$ is discharged before being completely charged and it is charged again by the multivibrator $3_4$ which is thus triggered again. Accordingly, an output signal from the one-shot multivibrator 9 for a period of time $T_1$ is again produced. Therefore, the stop state is prolonged by the period of time $T_1$. Thus, in switching from the forward playback mode to the reverse playback mode or vice versa, the direction of rotation of the capstan motor is changed while a period of time $T_1$ is alotted during which time no reproduction is carried out until the rotation of the capstan motor becomes stable. That is, no reproduction takes place for a period of time $T_1$ after depression of the forward switch $1_1$ or the reverse switch $1_2$.

In the case where the fast-forward (FF) switch $1_3$ is depressed during a forward playback operation, the low level signal produced thereby is applied to the fast foward terminal (FF) of the control circuit 9 as a result of which the circuit 9 sets the condition for a fast-forward operation while the flip-flop circuit $3_2$ is reset with its output Q in the "L" state so that the outputs of the AND gates $5_1$ and $5_2$ are set to "L" and therefore the outputs of the AND gate $5_3$ and $5_4$ are also set to "L." Thus, the capacitor $C_4$ which has been charged at the start of forward playback for forming the differentiation pulse is discharged through the resistor $R_3$, the AND gate $5_3$ and the diode $D_1$ and is then placed in a standby state for producing the next succeeding differentiation pulse. In this case, the voltage to which the capacitor $C_5$ is charged is maintained unchanged because it has been previously discharged.

In the case where the rewind (REW) switch $1_4$ or the stop (STOP) switch $1_5$ is depressed during a forward playback operation, similarly, the flip-flop circuit $3_2$ is reset and therefore the capacitor is discharged. In addition, the control circuit 9 is set for a rewind operation is placed in the stop state.

If the pause (PAUSE) switch $1_6$ is depressed during a forward playback operation, the outputs Q and $\overline{Q}$ of the flip-flop circuit $3_3$ are set to "L" and "H," respectively, as a result of which the AND gates $5_3$ and $5_4$ are closed. Accordingly, similar to the above-described case, the capacitor $C_4$ is discharged and a low level signal is applied to the pause terminal (PAUSE) so that the control circuit 9 sets the condition for the pause state. Furthermore, as the output $\overline{Q}$ of the flip-flop circuit $3_3$ is then at "H," the pause plunger 12 causes the pinch roller to be retracted from the capstan. Upon depression of the pause (PAUSE) switch $1_6$ again, the state of the flip-flop circuit $3_3$ is changed and therefore the pause state is released.

When the reverse (REV) switch $1_2$ is depressed during the pause state, the flip-flop circuit $3_1$ is reset as a result of which the capstan motor M stops forward rotation and starts reverse rotation while the one-shot multivibrator $3_4$ is operated by the differentiation circuit 8 so that the transistors $Q_4$ and $Q_5$ are rendered conductive for the period of time $T_1$. Therefore, even if the pause (PAUSE) swtich $1_6$ is depressed again so as to change the outputs Q and $\overline{Q}$ of the flip-flop circuit $3_3$ to "H" and "L" respectively before the period of time $T_1$ has passed, the control circuit 9 is not placed in the reverse state. The reverse state is obtained only after the period of time $T_1$ has passed.

In this case, the output $\overline{Q}$ at "H" of the one-shot multivibrator $3_4$ is applied to one input terminal of the NAND circuit $6_2$ to the other input terminal of which the high level signal at the output terminal $9a$ of the control circuit 9 is applied. Therefore, the pause plunger 12 is released after the sum of the periods of time $T_1$ and $T_2$ has passed which is the same time that the voltage of the capacitor is discharged through resistor $R_8$. In this case also, a sufficient period of time is provided for stabilizing the rotation of the capstan motor.

If the pause switch $1_6$ is depressed for providing a temporary stop state and then the fast-forwarding switch $1_3$, the rewinding switch $1_4$ or the stop switch is depressed, the output of the OR circuit $4_3$ is raised to "H" while the output of the the NAND circuit $6_4$ is set to "L" as a result of which the output of the inverter $2_6$ is again raised to "H." Accordingly, the outputs Q and $\overline{Q}$ of the flip-flop circuit $3_3$ are restored to "H" and "L," respectively, and therefore the pause state is released. During a fast-forward or rewind operation or when the stop switch $1_5$ is maintained depressed, the high level signal is applied to one input terminal of the OR circuit $4_4$. Therefore, even if the pause switch $1_6$ is depressed, the output of the OR circuit $4_4$ is not set to "L" and hence the outputs Q and $\overline{Q}$ of the flip-flop circuit $3_3$ are maintained at "H" and "L," respectively, and no pause operation is carried out.

Upon depression of the stop switch $1_5$ during a forward playback operation, the low level signal is applied to the stop terminal (STOP) of the control circuit 9 to thereby place the circuit 9 in the stop state while the flip-flop circuit $3_2$ is reset with its output Q in the "L" state. As a result, the AND gates $5_1$ through $5_4$ are closed and hence their outputs are in the "L" state. Accordingly, the capacitor $C_4$ is discharged.

When, under this condition, the reverse switch $1_2$ is depressed, the flip-flop circuit $3_2$ is set while the flip-flop circuit $3_1$ is reset whereby the direction of rotation of the capstan is reversed. In this case also, after the period of time $T_1$ has elapsed as determined by the differentiation circuit 8 and the one-shot multivibrator and associated components as described above, a negative pulse is applied to the reverse (REV) terminal of the control circuit to shift the operation thereof to that for reverse playback. In other words, the period of time $T_1$ is provided for stabilization of the capstan motor M.

In the case where during a forward playback operation the fast-forward switch $1_3$ or the rewind switch $1_4$ is depressed and then the reverse switch $1_2$ is depressed, the flip-flop circuit $3_1$ is reset to allow the capstan motor M to start reverse rotation while the flip-flop circuit $3_2$ is set to open the AND gates $5_1$ and $5_2$. The control circuit 9 is placed in the stop state by the low level output of the NAND circuit $6_1$ for the period of time $T_1$ set by the one-shot multivibrator $3_4$. That is, the stop mode is maintained until the reverse rotation of the capstan motor M has become stable after which reverse playback is carried out.

When the reel speed is reduced below the predetermined value $V_1$ in the stop mode, the signal generating circuit 11 provides a low level signal which is applied to the electric brake reset terminal (EBR) of the control circuit 9 to release the electromagnetic brake applied to the reel motor during the fast-forward operation and to mechanically brake the reel. At the same time, a high level signal is provided at the output terminal $9a$ of the control circuit 9 which is applied to the NAND gate $6_2$. The output $\overline{Q}$ at "H" of the one-shot multivibrator $3_4$ is applied to the other input terminal of the NAND gate $6_2$ for the period of time $T_1$ after depression of the reverse switch $1_2$. Accordingly, if the reel speed is reduced to the value $V_1$ during the period of time $T_1$ after depression of the reverse switch $1_2$, the transistor $Q_8$ is maintained conductive by the low level output of the NAND circuit $6_2$ for a time interval defined by the sum of the periods of time $T_1$ and time $T_2$ defined by the time constant of the resistor $R_8$ and the capacitor $C_6$ after the reel speed has been reduced to the value $V_1$ as a result of which the pause plunger 12 is operated. In other words, in the case that it is desired to reduce the reel speed earlier, the pause state is established. However, the pause state is released when the period of time $T_1+T_2$ has passed so that the operation is shifted to the reverse playback operation without irregular running of the tape and vibration of the capstan. However, in the case when the reel speed is reduced to the value $V_1$ after the period of time $T_1+T_2$ has passed, no low level output is provided by the NAND circuit $6_2$ and therefore the operation is shifted to the reverse playback mode immediately after the period of time $T_1+T_2$ has passed.

In the case also when during a reverse playback operation the rewind switch $1_4$ or the fast-forward switch $1_3$ is depressed and thereafter the forward switch $1_1$ is depressed, if the reel speed is reduced to the value $V_1$ before the period of time $T_1+T_2$ has passed, the pause state is established until the period of time $T_1+T_2$ has passed following the reduction of the reel speed to the value $V_1$. Thereafter, reverse playback mode is shifted to the forward playback mode. However, if the reel speed is reduced to the value $V_1$ when the period of time $T_1+T_2$ has passed after the depression of the forward switch $1_1$, then the reverse playback mode is immediately shifted to the forward playback mode.

What is claimed is:

1. A playback mode switching circuit for a tape recorder, comprising:
    a first flip-flop circuit coupled to be set by operation of a forward switch and reset by operation of a reverse switch, to provide two outputs for selectively determining a direction of rotation of a capstan;
    gate means receiving said two outputs to provide a forward operation signal and a reverse operation signal; and
    a second flip-flop circuit coupled to be set by operation of either one of said forward switch and said reverse switch and coupled to be reset by a fast forward switch, a rewind switch or a stop switch, said gate means being opened when said second flip-flop circuit is set and closed when said fast-forward switch, said rewind switch or said stop switch is operated.

2. A playback mode switching pause period setting circuit for a tape recorder in which a forward playback operation in which a capstan is rotated in a forward direction is carried out in response to operation of a forward switch and a reverse operation is carried out in which the direction of rotation of said capstan is reversed in response to operation of a reverse switch comprising:

a control circuit;

means for changing the direction of rotation of a capstan motor in response to operation of said switches;

a one-shot multivibrator operatively coupled to be triggered by operation of said direction changing means; and a capacitor operatively coupled to said one-shot multivibrator to determine the output pulse width of said one-shot multivibrator, said capacitor being coupled to be discharged momentarily by a pulse produced upon operation of said direction changing means thereby to trigger said one-shot multivibrator, said control circuit being placed in a stop state for the operating period of said one-shot multivibrator in response to triggering of said one-shot multivibrator; and means for producing signals for setting said control circuit to establish one of a forward playback operation or a reverse playback operation in response to the operation of a corresponding one of said forward switch and said reverse switch.

3. A playback mode switching pause period setting circuit for a tape recorder comprising:

a first flip-flop circuit coupled to be set by a forward operation signal and reset by a reverse operation signal to provide first and second outputs correspondingly respectively thereto;

drive circuit means receiving said two outputs for determining a direction of rotation of a capstan;

control circuit means for determining a direction of rotation of a reel;

differentiation circuit means and gate means, said outputs of said first flip-flop circuit being applied through said differentiation circuit means and said gate means to said control circuit means, a one-shot multivibrator for producing an output pulse having a predetermined time duration in response to an output of said differentiation circuit means; and a second flip-flop circuit coupled to be set by said forward operation signal or said reverse operation signal and reset by a stop operation signal, said control circuit means being coupled to be set to a stop state in response to said one-shot multivibrator producing a pulse for said predetermined period of time in response to said output of said differentiation circuit means, said gate means being coupled to be opened and closed selectively by outputs of said second flip-flop circuit wherein, when the direction of rotation of said capstan is changed by effecting a forward playback operation or a reverse play back operation during said stop state, said control circuit is set to a stop state for said predetermined period of time.

4. A playback mode switching pause period setting circuit for a tape recorder comprising:

a control circuit;

a flip-flop circuit coupled to be set by a forward operation signal and reset by a reverse operation signal;

a drive circuit operating in response to first and second outputs of said first flip-flop circuit for determining a direction of rotation of a capstan;

a differentiation circuit and gate means, said first and second outputs being applied through said differentiation circuit and said gate means to said control circuit for determining a direction of rotation of a reel;

a one-shot multivibrator, said control circuit being placed in a stop state by operation of said one-shot multivibrator which operates for a predetermined period of time in—response to an output of said differentiation circuit;

a second flip-flop circuit, said gate means being coupled to operate in response to outputs of said second flip-flop circuit which is set by either one of said forward operation signal and said reverse operation signal and is reset by a fast-forward operation signal or a rewind operation signal, and wherein, when the direction of rotation of said capstan is changed by effecting a forward operation or a reverse operation during a fast-forward operation or a rewind operation, said control circuit is set to a stop state for said predetermined period of time.

5. A playback mode switching pause period setting circuit for a tape recorder comprising:

a control circuit, a first flip-flop circuit coupled to be set by a forward operation signal and reset by a reverse operation signal;

a drive circuit operating in response to first and second outputs of said first flip-flop circuit for determining a direction of rotation of a capstan;

a differentiation circuit and gate means, said first and second outputs being applied through said differentiation circuit and said gate means to said control circuit for determining a direction of rotation of a reel;

a one-shot multivibrator, said control circuit being placed in a stop state by operation of said one-shot multivibrator which operates for a predetermined period of time in response to an output of said differentiation circuit;

a second flip-flop circuit, said gate means being coupled to operate in response to outputs of a second flip-flop circuit which is coupled to be alternately set and reset whenever a pause operation signal is applied thereto thereby to effect a pause operation and to release said pause operation, and wherein, when the direction of rotation of said capstan is changed by effecting a forward operation or a reverse operation during said pause operation, said control circuit is maintained in a stop state for said predetermined period of time after said forward operation or said reverse operation has been effected even if said pause operation is released.

6. A playback mode switching circuit for a tape recorder comprising:

forward, reverse, fast forward, rewind, stop and pause switches each having a first terminal thereof connected to ground;

first through fifth inverters having inputs respectively coupled to second terminals of said forward, reverse, fast forward, rewind and stop switches;

a first OR gate having a first input coupled to an output of said first inverter and a second input coupled to an output of said second inverter;

a second OR gate having first, second and third inputs coupled respectively to outputs of said third, fourth and fifth inverters;

a first S-R flip-flop having an S input coupled to said output of said first inverter and a R input coupled to said output of said second inverter;

a second S-R flip-flop having an S input coupled to an output of said first OR gate and a R input coupled to an output of said second OR gate;

a motor drive circuit having first and second control inputs coupled, respectively, to Q and $\overline{Q}$ outputs of said first S-R flip-flop, said drive circuit operating a capstan motor in a first direction when said output is at a high level and operating said motor in the opposite direction when said $\overline{Q}$ output is at a high level;

a first AND gate having a first input coupled to said $\overline{Q}$ output of said first S-R flip-flop and a second input coupled to a $\overline{Q}$ output of said second S-R flip-flop;

a second AND gate having a first input coupled to said Q output of said first S-R flip-flop and a second input coupled to said $\overline{Q}$ output of said second S-R flip-flop;

a third AND gate having a first input coupled to an output of said first AND gate;

a fourth AND gate having a first input coupled to an output of said second AND gate;

a differentiation circuit including a first capacitor having one terminal coupled to said Q output of said S-R flip-flop, a PNP transistor having a base electrode coupled to a second terminal of said first capacitor and an emitter coupled to a positive power source, a first resistor coupled between an emitter of said first PNP transistor and ground, a second PNP transistor having an emitter and collector coupled to said emitter and said collector, respectively, of said first PNP transistor, and a second capacitor having a first terminal coupled to said $\overline{Q}$ output of said first S-R flip-flop and a second terminal coupled to a base electrode of said second PNP transistor;

a third NPN transistor having a base electrode coupled to said collectors of said first and second transistors and an emitter coupled to ground;

a one-shot multivibrator having a trigger input terminal coupled to said base electrode of said third transistor;

a third capacitor coupled between a timing control input of said one-shot multivibrator and ground, a collector of said third transistor being coupled to said control terminal of said one-shot multivibrator;

a fifth AND gate having a first input coupled to a second terminal of said pause switch;

a third T-type flip-flop;

a first diode and a sixth inverter coupled in series between an output of said fifth AND gate and said third flip-flop;

a sixth AND gate having a first input coupled to a $\overline{Q}$ output of said third flip-flop;

a second diode coupled between connection point between said first diode and said sixth inverter and an output of said sixth AND gate;

a third OR gate having a first input coupled to said output of said fifth inverter;

a third diode coupled between an output of said third OR gate and a second input of said fifth AND gate, a second input of said sixth AND gate being coupled to said second input of said fifth AND gate;

a $\overline{Q}$ output of said third flip-flop being coupled to second inputs of said third and fourth AND gates;

a first NAND gate having a first input coupled to said T input of said third flip-flop and a second input coupled to said $\overline{Q}$ output of said third flip-flop;

a second NAND gate having a first input coupled to a $\overline{Q}$ output of said one-shot multivibrator and a second input coupled to said Q output of said second flip-flop;

fourth through seventh PNP transistors each having an emitter coupled to ground;

a third resistor having one terminal coupled to an output of said third AND gate;

a fourth capacitor having one terminal coupled to a second terminal of said third resistor and a collector of said fourth transistor and a second terminal coupled to a base electrode of said sixth transistor;

a fourth resistor having a first terminal coupled to an output of said fourth AND gate and a second terminal coupled to a collector of said fifth transistor;

a fifth capacitor having a first terminal coupled to said second terminal of said fourth resistor and a second terminal coupled to a base electrode of said seventh transistor;

a fifth resistor having a first terminal coupled to said $\overline{Q}$ output of said one-shot multivibrator and a second terminal coupled to a base electrode of said fourth transistor;

a sixth resistor having a first input coupled to said $\overline{Q}$ output of said one-shot multivibrator and a second terminal coupled to a base electrode of said fifth transistor;

a fourth diode having a cathode terminal coupled to said base terminal of said sixth transistor and an anode electrode coupled to ground;

a fifth diode having a cathode terminal coupled to said base electrode of said seventh transistor and an anode electrode coupled to ground;

sixth and seventh diodes, said sixth diode having a cathode terminal coupled to an output of said second NAND gate and an anode terminal coupled to an anode terminal of said seventh diode, and said seventh diode having a cathode terminal coupled to said input of said fifth inverter;

a control circuit having forward, reverse, pause, fast forward, rewind, stop, and electric brake reset input terminals, said forward input terminal being coupled to a collector of said sixth transistor, said reverse input terminal being coupled to a collector of said seventh transistor, said fast forward input terminal being coupled to said input of said third inverter, said rewind input terminal being coupled to said input of said fourth inverter, and said stop input terminal being coupled to said anodes of said sixth and seventh diodes;

a speed detector for producing an output signal in response to the rotational speed of a reel motor, said output signal being coupled to said electric brake reset input terminal of said control circuit;

a seventh diode having a cathode terminal coupled to an output of said first NAND gate and an anode terminal coupled to said pause input terminal of said control circuit;

a fourth OR gate having a first input coupled to a fast forward control signal output of said control circuit and a second input coupled to a rewind control signal output of said control circuit and an output coupled to a second input of said OR gate;

a third NAND gate having a first input coupled to a pause plunger control signal output of said control circuit;

seventh and eighth resistors having first input terminals thereof coupled to said $\overline{Q}$ output of said one-shot multivibrator;

an eighth diode having an anode terminal coupled to a second terminal of said seventh resistor;

a sixth capacitor having a first terminal coupled to a cathode terminal of said eighth diode, a second terminal of said eighth resistor and a second input of said third NAND gate and a second terminal coupled to ground;

an eighth PNP transistor having a base electrode coupled to an output of said third NAND gate and an emitter coupled to said positive power source;

a ninth diode having an anode terminal coupled to said $\overline{Q}$ output of said third flip-flop and a cathode terminal coupled to a collector of said eighth transistor and to an actuating input of a pause plunger; and a ninth resistor having a first terminal coupled to said $\overline{Q}$ output of said one-shot multivibrator and a second input terminal coupled to said first terminal of said third capacitor.

* * * * *